(12) United States Patent
Ando (10) Patent No.: US 12,077,109 B2
(45) Date of Patent: Sep. 3, 2024

(54) WIRE HARNESS SUPPORT MEMBER AND WIRE HARNESS

(71) Applicant: SUMITOMO WIRING SYSTEMS, LTD., Mie (JP)

(72) Inventor: Yusuke Ando, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 113 days.

(21) Appl. No.: 17/795,416

(22) PCT Filed: Jan. 25, 2021

(86) PCT No.: PCT/JP2021/002457
§ 371 (c)(1),
(2) Date: Jul. 26, 2022

(87) PCT Pub. No.: WO2021/161767
PCT Pub. Date: Aug. 19, 2021

(65) Prior Publication Data
US 2023/0101956 A1 Mar. 30, 2023

(30) Foreign Application Priority Data
Feb. 12, 2020 (JP) ................................. 2020-021423

(51) Int. Cl.
*B60R 16/02* (2006.01)
(52) U.S. Cl.
CPC ................................ *B60R 16/0215* (2013.01)
(58) Field of Classification Search
CPC ... H02G 3/04; H02G 3/30; H02G 3/32; B60R 16/0215; F16L 3/02
See application file for complete search history.

(56) References Cited

U.S. PATENT DOCUMENTS 5,332,183 A * 7/1994 Kagayama ................. B62J 6/03
248/223.41
6,206,330 B1 * 3/2001 Oi ........................... F16L 3/223
248/68.1

(Continued)

FOREIGN PATENT DOCUMENTS

JP 2007-290435 A 11/2007
JP 2011-152846 A 8/2011

(Continued)

OTHER PUBLICATIONS

International Search Report issued on Apr. 6, 2021 for WO 2021/161767 A1 (4 pages).

*Primary Examiner* — Paresh Paghadal
(74) *Attorney, Agent, or Firm* — Venjuris, P.C.

(57) ABSTRACT

An aspect of the present disclosure provides a wire harness support member that makes it easier to increase the range in which a position tolerance of a bolt can be handled. A support member according to one aspect of the present disclosure includes: a main body portion that includes a holding portion for holding an electric wire; and a bolt fixing member that is a separate member from the main body portion. The bold fixing member includes a fixing hole into which a bolt provided on a vehicle body side is inserted and fixed, and an insertion portion serving as a supported portion. The main body portion includes a groove portion that is formed along a direction that intersects an axial direction of the bolt (height direction), and the groove portion movably supports the insertion portion in the length direction of the groove portion (height direction).

6 Claims, 4 Drawing Sheets

(56) References Cited

U.S. PATENT DOCUMENTS

| | | | |
|---|---|---|---|
| 2003/0136884 A1* | 7/2003 | Miura | F16B 37/00 |
| | | | 248/68.1 |
| 2008/0105796 A1* | 5/2008 | Nix | F16L 3/222 |
| | | | 248/74.1 |
| 2013/0047385 A1* | 2/2013 | Healy | F16B 7/042 |
| | | | 24/572.1 |
| 2018/0266588 A1* | 9/2018 | Netke | F16L 55/02 |
| 2019/0143912 A1* | 5/2019 | Schwiderski | F16L 3/243 |
| | | | 248/63 |

FOREIGN PATENT DOCUMENTS

| | | |
|---|---|---|
| JP | 2011-236940 A | 11/2011 |
| WO | 2018/179262 A1 | 10/2018 |

\* cited by examiner

WIRE HARNESS SUPPORT MEMBER AND WIRE HARNESS

CROSS REFERENCE TO RELATED APPLICATIONS

This application is a national phase of PCT application No. PCT/JP2021/002457, filed on 25 Jan. 2021, which claims priority from Japanese patent application No. 2020-021423, filed on 12 Feb. 2020, all of which are incorporated herein by reference.

TECHNICAL FIELD

The present disclosure relates to a wire harness support member and a wire harness.

BACKGROUND

For example, Patent Document 1 discloses a support member for supporting an electric wire of a wire harness on a vehicle body. The support member includes a frame body and a bolt fixing portion formed in the frame body, and the bolt fixing portion includes a fixing hole into which a bolt protruding from the vehicle body is inserted. Also, a flexible portion (a flexible hinge body) is formed between the bolt fixing portion and the frame body so as to integrally join the bolt fixing portion and the frame body to each other. Accordingly, when fixing the support member to a bolt on the vehicle body, the position of the fixing hole of the bolt fixing portion is displaced relative to the frame body due to flexing of the flexible portion, and thus the position tolerance of the bolt (positional deviation in a direction orthogonal to the axial direction of the bolt) can be absorbed.

PRIOR ART DOCUMENT

Patent Document

Patent Document 1: JP 2011-236940 A

SUMMARY OF THE INVENTION

Problems to be Solved

In such a support member of the above embodiment, the flexible portion is formed as one piece with the bolt fixing portion and the frame body, and thus the range of movement of the bolt fixing portion realized by flexing of the flexible portion is likely to be small. Thus, if the position tolerance of the bolt is large, there is a concern that such a tolerance cannot be handled by the displacement of the bolt fixing portion realized by flexing of the flexible portion. If the flexing amount of the flexible portion was to be increased by, for example, increasing the length of the flexible portion, concerns such as a reduction in the rigidity of the flexible portion would arise, and thus it is difficult to increase the movement range of the bolt fixing portion in a configuration that utilizes flexing of the flexible portion.

Thus, it is an object of the present disclosure to provide a wire harness support member and a wire harness that make it easier to increase the range in which a position tolerance of a bolt can be handled.

Means to Solve the Problem

In the present disclosure, an electric wire of a wire harness is supported on a vehicle body via a wire harness support member. The wire harness support member including: a main body portion that includes a holding portion for holding the electric wire; and a bolt fixing member that is a separate member from the main body portion, wherein the bolt fixing member includes a fixing hole into which a bolt protruding from the vehicle body is inserted and fixed, and a supported portion, the main body portion includes a support portion for movably supporting the supported portion, and one of the support portion and the supported portion is a groove portion that is formed in a direction that intersects an axial direction of the bolt, and the other of the support portion and the supported portion is an insertion portion that is to be inserted into the groove portion.

Also, a wire harness according to the present disclosure, including: the wire harness support member; and an electric wire supported on a vehicle body via the wire harness support member.

Effect of the Invention

With the present disclosure, a wire harness support member and a wire harness can be provided that make it easier to increase the range in which a position tolerance of a bolt can be handled.

DETAILED DESCRIPTION TO EXECUTE THE INVENTION

Description of Embodiments of Present Disclosure

First, embodiments of the present disclosure will be listed and described below.

[1] An electric wire of a wire harness is supported on a vehicle body via a wire harness support member. The wire harness support member including: a main body portion that includes a holding portion for holding the electric wire; and a bolt fixing member that is a separate member from the main body portion, wherein the bolt fixing member includes a fixing hole into which a bolt protruding from the vehicle body is inserted and fixed, and a supported portion, the main body portion includes a support portion for movably supporting the supported portion, and one of the support portion and the supported portion is a groove portion that is formed in a direction that intersects an axial direction of the bolt, and the other of the support portion and the supported portion is an insertion portion that is to be inserted into the groove portion.

With this configuration, as a result of the bolt fixing member moving in the length direction of the groove portion, it is possible to handle the position tolerance of the bolt on the vehicle body side. Thus, if the position tolerance of the bolt is large, the position tolerance can be handled by increasing the length of the groove portion to increase the movement amount of the bolt fixing member. Accordingly, in comparison to a conventional configuration in which the tolerance is absorbed by a flexible portion formed as one piece with the main body portion, the range in which position tolerance of the bolt can be handled can be easily increased.

[2] The bolt fixing member includes a pair of pinching pieces that protrude into the fixing hole so as to oppose each other in a length direction of the groove portion, and the pair of pinching pieces pinch the bolt inserted into the fixing hole.

With this configuration, the pair of pinching pieces can fix the bolt in the fixing hole while allowing relative movement of the bolt in a direction orthogonal to the direction in which the pair of pinching pieces oppose each other. Accordingly, position tolerance of the bolt in a direction intersecting the length direction of the groove portion can be absorbed.

[3] The insertion portion has a circular shape as seen in a length direction of the groove portion.

With this configuration, the contact area between the groove portion and the insertion portion can be reduced. As a result, displacement of the bolt fixing member is smooth, which contributes to making it easier to attach the wire harness support member to the vehicle body.

[4] The groove portion includes an open portion that is open on one side in a length direction of the groove portion, and the main body portion includes a cover for closing off the open portion.

With this configuration, the cover that closes off the open portion of the groove portion can prevent the insertion portion of the bolt fixing member from being dislodged from the main body portion.

[5] Also, a wire harness according to the present disclosure, including: the wire harness support member; and an electric wire supported on a vehicle body via the wire harness support member.

With this configuration, as a result of the bolt fixing member moving in the length direction of the groove portion, it is possible to handle the position tolerance of the bolt protruding from the vehicle body. Thus, if the position tolerance of the bolt is large, the position tolerance can be handled by increasing the length of the groove portion to increase the movement amount of the bolt fixing member. Accordingly, in comparison to a conventional configuration in which the tolerance is absorbed by a flexible portion formed as one piece with the main body portion, the range in which the position tolerance of the bolt can be handled can be easily increased.

Detailed Description of Embodiment of the Present Disclosure

Specific examples of a wire harness support member and a wire harness of the present disclosure will be described below with reference to the drawings. Note that the present disclosure is not limited to these illustrative examples, but is indicated by the claims, and all changes that come within the meaning and range of equivalency of the claims are intended to be embraced therein.

Figure 1:
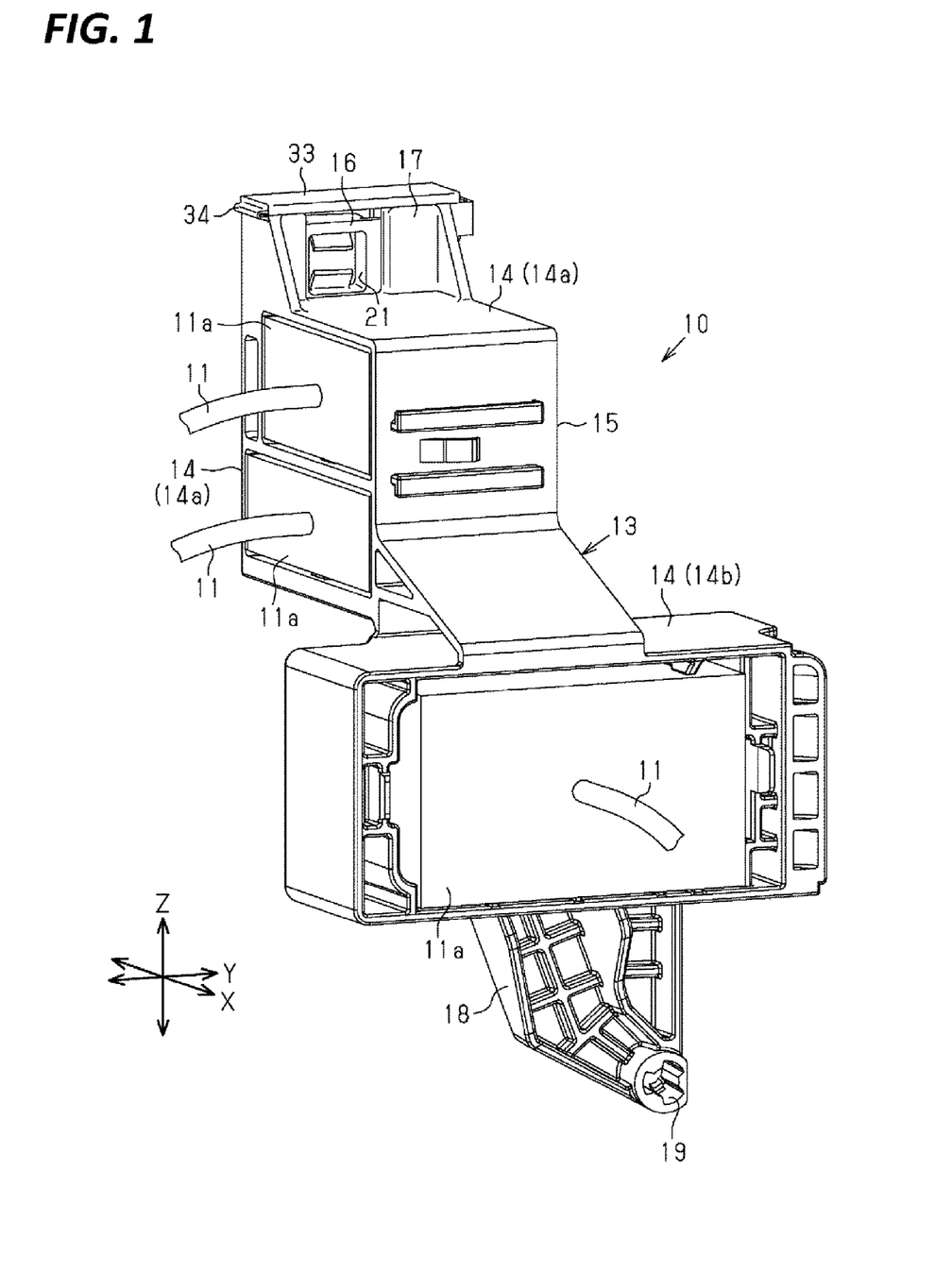
FIG. 1 is a perspective view of a wire harness according to an embodiment.
Figure 2:
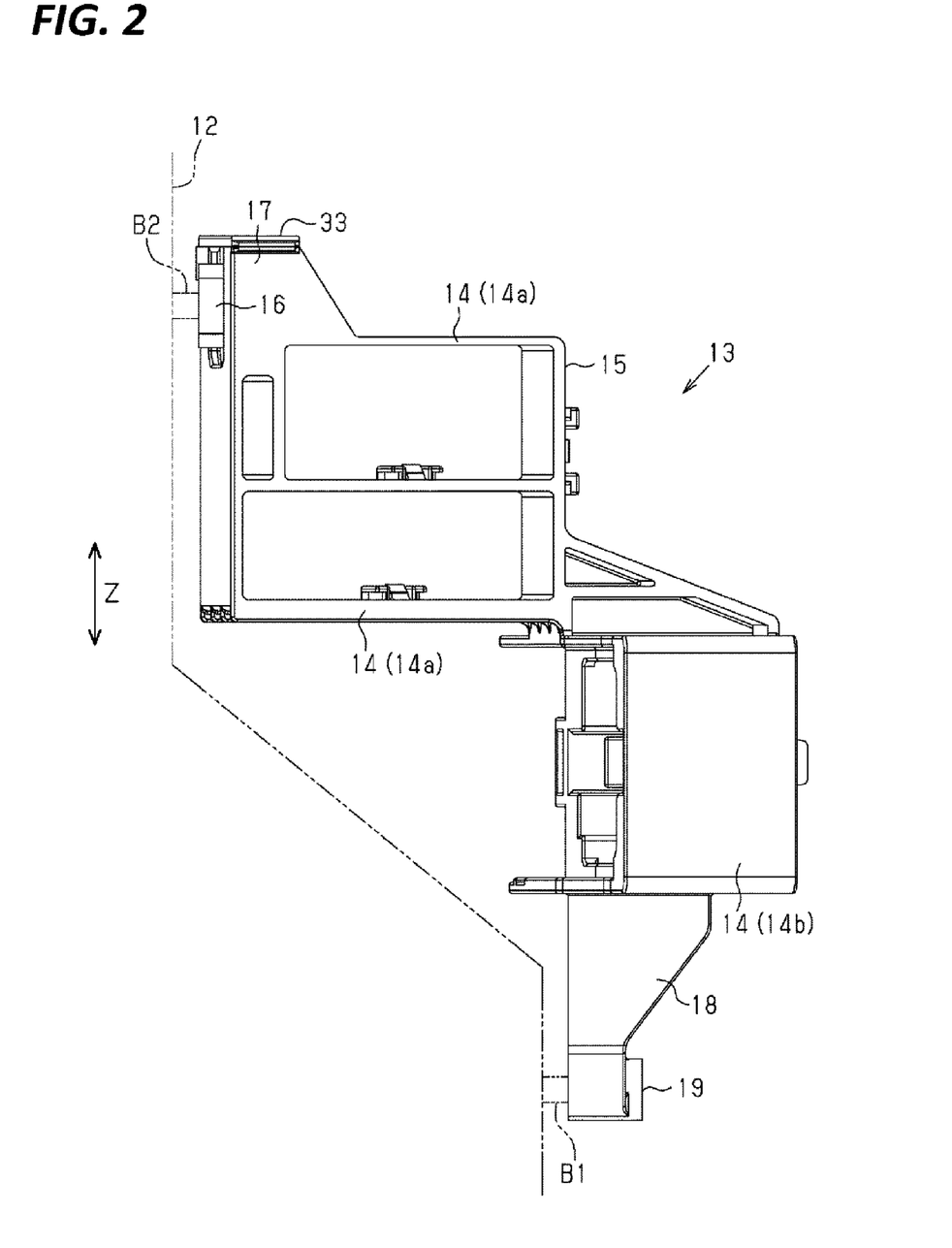
FIG. 2 is a side view showing a wire harness support member fixed to a vehicle body according to the embodiment.

As shown in FIGS. 1 and 2, a vehicle wire harness 10 of the present embodiment includes electric wires 11 each provided with a connector 11a at an end portion thereof, and a wire harness support member 13. The connectors 11a of the electric wires 11 are supported on a vehicle body 12 via the wire harness support member 13. In FIG. 2, illustration of the electric wires 11 including the connectors 11a is omitted. Of the mutually orthogonal XYZ axes in the drawings, the X axis indicates a depth direction X of the support member 13, the Y axis indicates the width direction Y of the support member 13, and the Z axis indicates the height direction Z of the support member 13. Also, in the following description, the wire harness support member 13 is simply referred to as the "support member 13".

The support member 13 includes a main body portion 15 that includes a holding portion 14 for holding connectors 11a, and a bolt fixing member 16 that is a separate member from the main body portion 15 and is attached to the main body portion 15.

Main Body Portion 15

The main body portion 15 of the support member 13 is an injection-molded component made of a synthetic resin. The main body portion 15 includes the holding portion 14 and an attachment portion 17 to which the bolt fixing member 16 is attached. The main body portion 15 of the present embodiment includes a plurality of, three or more for example, holding portions 14 that respectively hold the connectors 11a.

Note that, of the holding portions 14, two holding portions 14a have a frame shape when viewed in the width direction Y, and one holding portion 14b has a frame shape in the depth direction extending along the X axis. In other words, connectors 11a are attached to the holding portions 14a in the width direction Y, and a connector 11a is attached to the holding portion 14b in the depth direction X. Also, as a result of each connector 11a being attached to the corresponding holding portion 14, the electric wires 11 including the connectors 11a are supported on the vehicle body 12 via the support member 13.

The attachment portion 17 to which the bolt fixing member 16 is attached is formed on one side face in the height direction Z of the holding portions 14a (upper face in FIGS. 1 and 2).

The main body portion 15 has a fixing leg 18 that extends from one side face in the height direction Z of the holding portion 14b (lower face in FIGS. 1 and 2), along the height direction Z. The fixing leg 18 is formed as one piece with the main body portion 15, and thus is unable to move relative to the main body portion 15. The leading end portion of the fixing leg 18 is provided with a locking hole 19 into which a bolt B1 protruding from the vehicle body 12 is to be inserted and fixed.

Bolt Fixing Member 16

Figure 3:
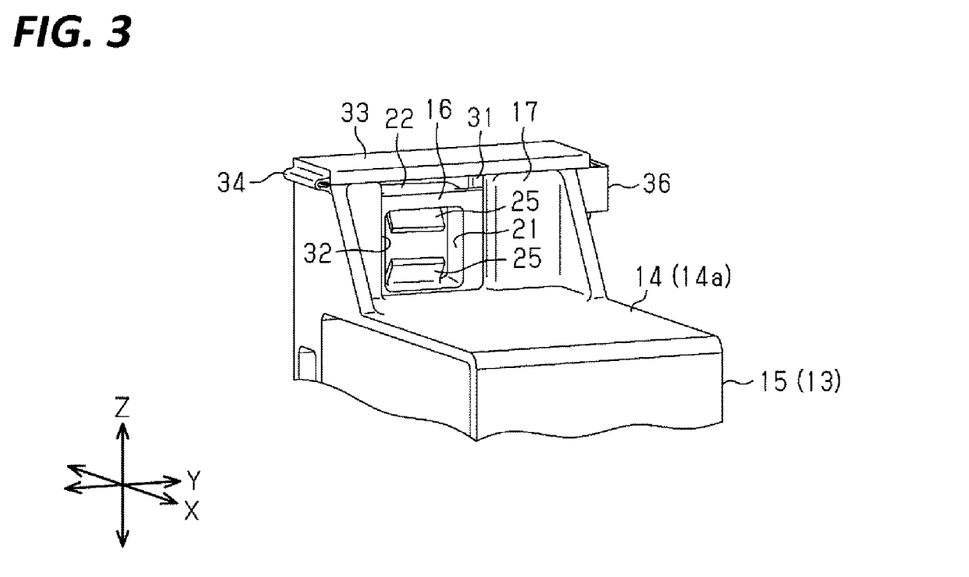
FIG. 3 is an enlarged perspective view showing a main portion of the wire harness support member of the same embodiment.
Figure 4:
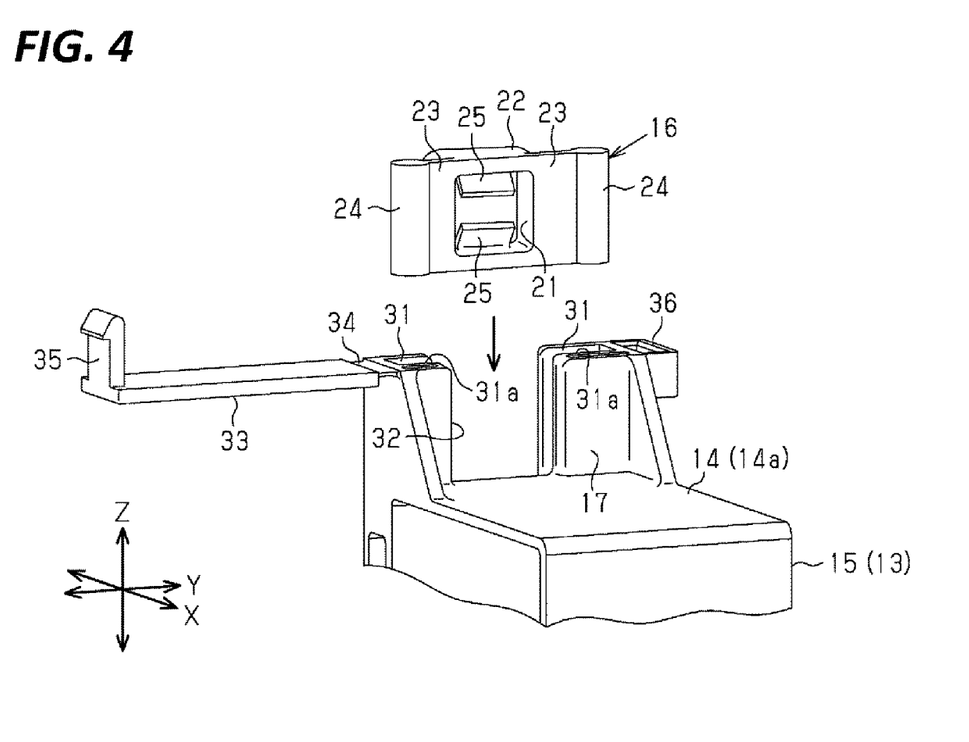
FIG. 4 is an enlarged exploded perspective view showing a main portion of the wire harness support member of the same embodiment.
Figure 5:
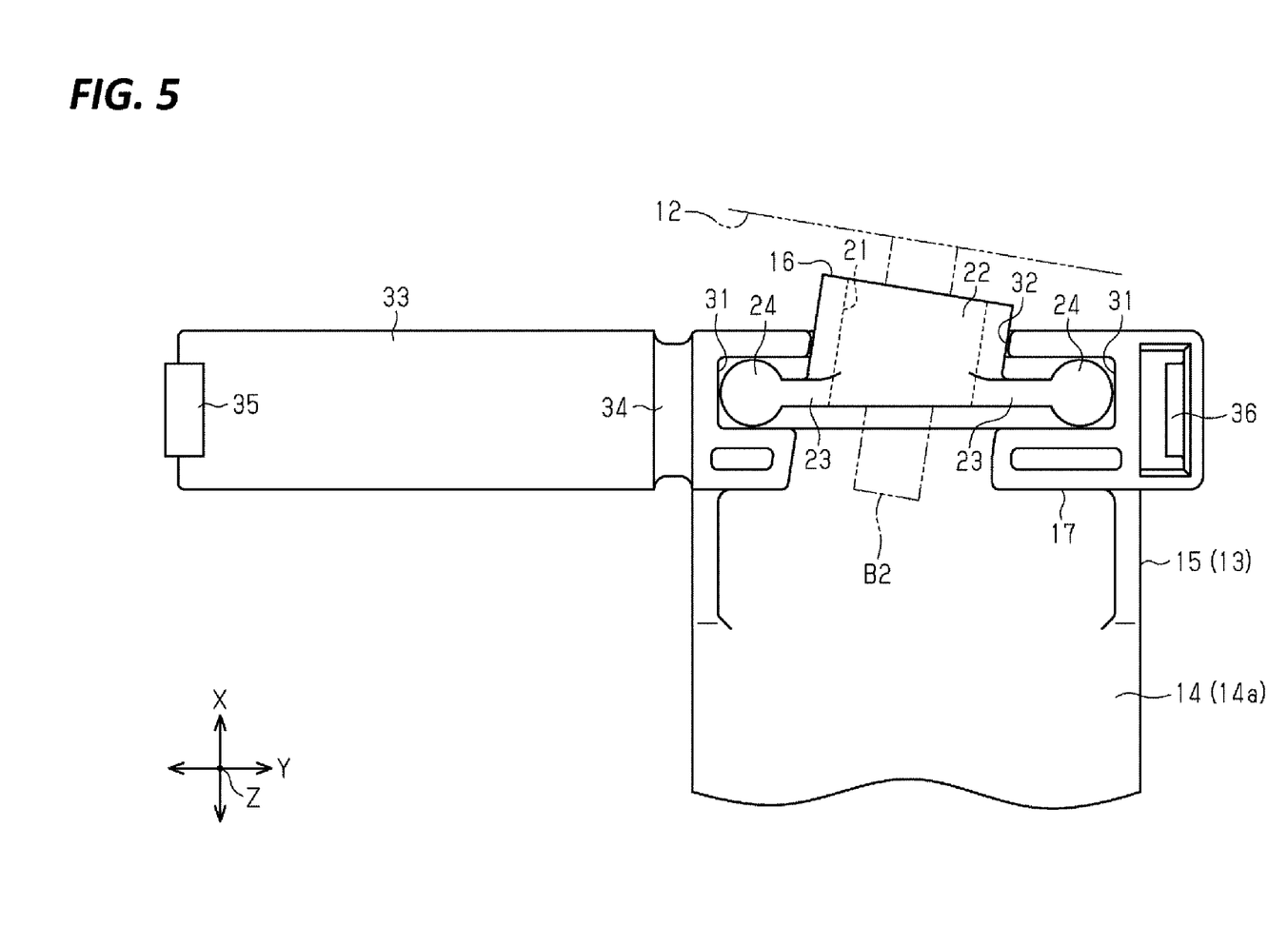
FIG. 5 is an enlarged plan view showing a main portion of the wire harness support member of the same embodiment.

As shown in FIGS. 3, 4, and 5, the bolt fixing member 16 is an injection-molded component made of a synthetic resin. The bolt fixing member 16 includes a base portion 22 that has a fixing hole 21, two arm portions 23 that respectively extend toward two sides in the width direction Y of the base portion 22, and two insertion portions 24. The insertion portions 24 are respectively located at the leading ends of the arms 23. It should be noted that FIG. 3 shows a later-described cover 33 of the attachment portion 17 in a closed state, and FIGS. 4 and 5 show the cover 33 in an open state.

The cross-sectional shape of the insertion portion 24 in a direction orthogonal to the height direction Z is a circular shape. The insertion portion 24 of the present embodiment has a round column shape that extends along the height direction Z.

A bolt B2 protruding from the vehicle body 12 is inserted into and fixed to the fixing hole 21 of the base portion 22. Specifically, the base portion 22 has a pair of pinching pieces 25 that extend from the inner surface of the fixing hole 21 into the fixing hole 21. The pair of pinching portions 25 oppose each other in a direction extending along the length direction of the insertion portions 24 (height direction Z) (that is, the length direction of a later-described groove portion 31). The pair of pinching pieces 25 pinch the bolt B2 inserted into the fixing hole 21 in a direction orthogonal to the axial direction of the bolt B2. Also, the leading end portion of each pinching piece 25 is locked to the threading on the outer circumferential surface of the bolt B2, in the axial direction of the bolt B2. Accordingly, the bolt B2 is fixed in the fixing hole 21.

As shown in FIG. 5, a configuration is employed where, in a state where the bolt fixing member 16 is attached to the attachment portion 17, one end portion in an opening direction of the base portion 22 protrudes toward the vehicle body 12 from the attachment portion 17. Also, in the present embodiment, the axial direction of the bolt B2 is inclined relative to the depth direction X of the support member 13, and thus the opening direction of the base member 22 (opening direction of the fixing hole 21) is configured to be inclined relative to the depth direction X of the support member 13.

Attachment Portion 17

As shown in FIGS. 4 and 5, the attachment portion 17 to which the bolt fixing member 16 is attached has a pair of groove portions 31 that extend along the height direction Z. The groove portions 31 are support portions that movably support the insertion portions 24, which are supported portions. The pair of groove portions 31 are provided so that respective openings oppose each other in the width direction Y. Also, each groove portion 31 is substantially rectangularly shaped as seen in a plan view (see FIG. 5). Specifically, the inner side surfaces of each groove portion 31 include a pair of flat surfaces that are orthogonal to the depth direction X and oppose each other, and a flat surface that is orthogonal to the width direction Y.

As shown in FIG. 5, the insertion portions 24 of the bolt fixing member 16 are inserted into the corresponding groove portions 31. Each insertion portion 24 is inserted into a groove portion 31 such that the axial direction thereof (axial direction along the center of the circular shape) matches the length direction of the corresponding groove portion 31 (height direction Z). Each insertion portion 24 can move along the height direction Z in the corresponding groove portion 31. Thus, the bolt fixing member 16 can be displaced in the length direction of the groove portions 31 (height direction Z). By displacing the bolt fixing member 16 in the height direction Z, the fixing hole 21 can be brought closer to or distanced from the locking hole 19 of the fixing leg 18 (see FIG. 2). Note that, in a plan view (as seen in the height direction Z), the groove portions 31 are substantially rectangular while the insertion portions 24 are circular in shape, and thus the contact area between the groove portions 31 and the insertion portions 24 is extremely small.

As shown in FIGS. 4 and 5, a housing portion 32 for housing the base portion 22 is provided between the pair of groove portions 31, in the width direction Y. The housing portion 32 has a shape that is open on one side in the height direction Z (upper side in FIG. 4). The groove portions 31 are also open on the same side as the housing portion 32 in the height direction Z. That is, each groove portion 31 includes an open portion 31a at one end portion thereof in the length direction of the groove portion 31 (upper end portion in the height direction Z). Accordingly, the bolt fixing member 16 can be attached to the groove portions 31 and the housing portion 32 of the attachment portion 17, along the height direction Z.

The attachment portion 17 includes an openable/closable cover 33 for closing off the open portions in the height direction Z of the open portions 31a of the groove portions 31 and the housing portion 32. The cover 33 of the present embodiment is formed as one piece with the attachment portion 17. The cover 33 is formed so as to be able to pivot via a hinge portion 34 provided on the attachment portion 17. Accordingly, the cover 33 can pivot between the closed position shown in FIG. 3 and the open position shown in FIG. 4, with the hinge portion 34 serving as a pivot axis. Also, the attachment portion 17 is provided with a locked portion 36 to which a locking portion 35 of the cover 33 is locked when the cover 33 is at the closed position.

Operation of the present embodiment will be described.

When fixing the support member 13 to the bolts B1 and B2 protruding from the vehicle body 12, first, either one of the fixing hole 21 and the locking hole 19 is fixed to a bolt. Here, an example of attachment in which the fixing hole 21 is fixed to the bolt B2 first will be described.

First, the bolt fixing member 16 is attached to the bolt B2 such that the bolt B2 is inserted into the fixing hole 21. Then, the pair of pinching pieces 25 elastically pinch the bolt B2 in a direction orthogonal to the axial direction of the bolt B2 using the flexing of the pinching pieces 25 themselves. At this time, the leading ends of the pinching pieces 25 are locked to the outer circumferential surface of the bolt B2, in the axial direction of the bolt B2, and thus the bolt fixing member 16 is fixed in the axial direction of the bolt B2, but the bolt fixing member 16 can move in a direction that is orthogonal to the axial direction of the bolt B2 (a direction that is orthogonal to the direction in which the pair of pinching pieces 25 oppose each other). Also, the bolt fixing member 16 is capable of moving relative to the attachment portion 17 in the length direction of the groove portions 31 (height direction Z).

After the bolt fixing member 16 is fixed to the bolt B2, the bolt B1 is inserted into the locking hole 19 of the fixing leg 18. At this time, as described above, the pinching pieces 25 allow relative movement of the bolt fixing member 16 in a direction orthogonal to the axial direction of the bolt B2 in the fixing hole 21 as well as relative movement of the bolt fixing member 16 in the height direction Z. Thus, the attachment portion 17 of the support member 13 can move two-dimensionally along a plane that is orthogonal to the axial direction of the bolt B2. Thus, the relative position tolerance between the bolts B1 and B2 can be absorbed.

Effects of the present embodiment will be described.

(1) The groove portions 31 of the main body portion 15 movably support the insertion portions 24 of the bolt fixing member 16 in the length direction of the groove portions 31 (height direction Z). With this configuration, as a result of the bolt fixing member 16 moving in the length direction of the groove portions 31, it is possible to handle the position tolerance of the bolt B2 protruding from the vehicle body 12. Thus, if the position tolerance of the bolt B2 is large, the position tolerance can be handled by increasing the length of the groove portions 31 to increase the movement amount of the bolt fixing member 16. Accordingly, in comparison to a conventional configuration in which the tolerance is absorbed by a flexible portion formed as one piece with the main body portion 15, the range in which the position tolerance of the bolt B2 (position tolerance relative to the bolt B1) can be handled can be easily increased.

(2) The bolt fixing member 16 includes a pair of pinching pieces 25 that extend from the inner surface of the fixing hole 21 and oppose each other in a direction extending along the length direction of the groove portions 31 (height direction Z), and the pair of pinching pieces 25 pinch the bolt B2 inserted into the fixing hole 21 in a direction orthogonal to the axial direction of the bolt B2. With this configuration, the pair of pinching pieces 25 can fix the bolt B2 in the fixing hole 21 while allowing relative movement of the bolt B2 in a direction orthogonal to the direction in which the pair of pinching pieces 25 oppose each other (height direction Z). Accordingly, the position tolerance of the bolt B2 in a direction that is orthogonal to the length direction of the groove portions 31 (height direction Z) can be absorbed.

(3) The insertion portions 24 have a circular shape when seen in the length direction of the groove portions 31. With this configuration, the contact area between the groove portions 31 and the insertion portions 24 can be reduced. As a result, displacement of the bolt fixing member 16 is smooth, which contributes to making it easier to attach the support member 13 to the vehicle body 12.

(4) The groove portions 31 each include an open portion 31a that is open on one side in the length direction of the groove portion 31, and the main body portion 15 includes a cover 33 that closes off the open portions 31a. With this configuration, the insertion portions 24 of the bolt fixing member 16 can be attached to the groove portions 31 from the opening portions 31a. Also, the cover 33 that closes off the open portions 31a of the groove portions 31 can prevent the insertion portions 24 of the bolt fixing member 16 from being dislodged from the open portions 31a.

The present embodiment can be modified and implemented as described below. The present embodiment and the following modifications can be combined and implemented provided that no technical contradiction arises:

In the present embodiment, the support portions of the main body portion 15 are the groove portions 31, and the supported portions of the bolt fixing member 16 are the support portions 24 that are inserted into the groove portions 31, but there is no particular limitation to this. That is, the supported portions of the bolt fixing member 16 may be groove portions and the support portions of the main body portion 15 may be insertion portions that are inserted into the groove portions.

In the present embodiment, the cover 33 is formed as one piece with the attachment portion 17, but the present embodiment is not limited to this, and the cover 33 may be a separate member from the attachment portion 17 (main body portion 15).

The insertion portions 24 may have a cylindrical shape instead of a solid round column shape. Also, the outer shape of the insertion portions 24 as seen in the length direction of the groove portions 31 (height direction Z) is not limited to being a circular shape, and the outer shape of the insertion portions 24 can be appropriately changed according to the shape of the groove portions 31.

In the present embodiment, the axial direction of the bolt B2 is inclined relative to the depth direction X of the support member 13, but the present embodiment is not limited to this, and a configuration may be employed where the axis direction of the bolt B2 is parallel to the depth direction X of the support member 13 (orthogonal to the width direction Y).

In the present embodiment, the support member 13 (connector holder) for holding the connectors 11a using the holding portion 14 is embodied, but this is not particularly limiting, and a protector that covers the circumference of an electric wire of a wire harness to protect the electric wire may be embodied.

The present disclosure includes the following aspects. Reference numerals are given to constituent elements of the embodiments, not for limitation, but for facilitating understanding.

[Supplementary Note 1] A wire harness support member (13) according to an implementation example of the present disclosure may include:

a main body portion (15) that engages with a first bolt (B1) protruding from a vehicle body (12), and holds one or more wire harnesses (10); and a fixing member (16) that has a fixing hole (21) into which a second bolt (B2) protruding from the vehicle body (12) is to be inserted, and is a separate member from the main body portion (15), in which one of the main body portion (15) and the fixing member (16) may include a groove portion (31) that extends so as to intersect an axis of the second bolt, and the other of the main body portion (15) and the fixing member (16) may include an insertion portion (24) that can be moved along the groove portion (31).

[Supplementary Note 2] In one or more implementation examples of the present disclosure, an axis of the first bolt (B1) may be parallel with the axis of the second bolt (B2).

[Supplementary Note 3] In one or more implementation examples of the present disclosure, the fixing member (16) may include two pinching pieces (25) that protrude into the fixing hole (21) so as to approach each other, and the two pinching pieces (25) may be inclined relative to the axes such that the respective leading ends are distanced from the vehicle body relative to the respective base ends thereof.

[Supplementary Note 4] In one or more implementation examples of the present disclosure, the fixing member (16) may have a rectangular inner circumferential surface that demarcates the fixing hole (21), the rectangular inner circumferential surface may include four inner surfaces, and the two pinching pieces (25) may protrude respectively from two opposing surfaces of the four inner surfaces.

[Supplementary Note 5] In one or more implementation examples of the present disclosure, the two pinching pieces (25) may have a rectangular plate shape.

[Supplementary Note 6] In one or more implementation examples of the present disclosure, the first bolt (B1) may be disposed below the second bolt (B2).

[Supplementary Note 7] In one or more implementation examples of the present disclosure, the main body portion (15) may be disposed below the second bolt (B2).

[Supplementary Note 8] In one or more implementation examples of the present disclosure, the main body portion (15) may include a holding portion (14) disposed between the main body portion (15) and the first bolt (B1), and one or more of the wire harnesses (10) may include a first wire harness (10) that is connected to the main body portion (15) in a first direction, and a second wire harness (10) that is connected to the holding portion (14) in a second direction, and the first direction and the second direction may intersect each other.

[Supplementary Note 9] In one or more implementation examples of the present disclosure, the first wire harness (10) may include a connector (11a) that is connected to the main body portion (15), and a connection direction in which the connector (11*a*) is connected to the main body portion (15) or the first direction may intersect with the axis of the second bolt (2).

[Supplementary Note 10] In one or more implementation examples of the present disclosure, the main body portion (15) may include a cut out (32) configured so as to house the fixing member (16), wherein the cut out (32) may include an opening that is open in a direction that intersects with the axis, and the main body portion (15) may include a cover (33) that can open and close the opening in a state where the fixing member (16) is housed in the cut out (32).

[Supplementary Note 11] In one or more implementation examples of the present disclosure, the first bolt (B1) and the second bolt (B2) may be located at different positions along an axial direction of the second bolt (B2).

[Supplementary Note 12] In one or more implementation examples of the present disclosure, the fixing member (16) and the holding portion (14) may be located at different positions along the axis of the second bolt (B2).

It will be apparent to those skilled in the art that the present invention may be embodied in another specific form without departing from the technical idea thereof. For example, at least one of the components described in the embodiment (or one or more variations thereof) may be omitted, or some of those components may be combined. The scope of the present invention should be determined with reference to the appended claims, along with the full scope of equivalents to which such claims are entitled.

LIST OF REFERENCE NUMERALS

10 Wire harness
11 Electric wire
11*a* Connector
12 Vehicle body
13 Wire harness support member (support member)
14 (14*a*,14*b*) Holding portion
15 Main body portion
16 Bolt fixing member
17 Attachment portion
18 Fixing leg
19 Locking hole
21 Fixing hole
22 Base portion
23 Arm portion
24 Insertion portion (supported portion)
25 Pinching piece
31 Groove portion (support portion)
31*a* Open portion
32 Housing portion
33 Cover
34 Hinge portion
35 Locking portion
36 Locked portion
B1 Bolt
B2 Bolt
X Depth direction
Y Width direction
Z Height direction

What is claimed is:

1. A wire harness support member comprising:
  a main body portion that includes a holding portion for holding an electric wire of a wire harness supported on a vehicle body via the wire harness support member; and
  a bolt fixing member that is a separate member from the main body portion,
  wherein the bolt fixing member includes
    a fixing hole into which a bolt protruding from the vehicle body is inserted and fixed,
    a supported portion, and
    a pair of pinching pieces protruding into the fixing hole,
  the main body portion includes a support portion for movably supporting the supported portion,
  one of the support portion and the supported portion is a groove portion that is formed in a direction that intersects an axial direction of the bolt, and the other of the support portion and the supported portion is an insertion portion that is to be inserted into the groove portion, and
  the pair of pinching pieces oppose each other in a length direction of the groove portion and movably pinch the bolt inserted into the fixing hole such that the bolt fixing member is movable in a direction orthogonal to the length direction of the groove portion.

2. The wire harness support member according to claim 1, wherein the insertion portion has a circular shape as seen in a length direction of the groove portion.

3. The wire harness support member according to claim 1, wherein the groove portion includes an open portion that is open on one side in a length direction of the groove portion, and
  the main body portion includes a cover for closing off the open portion.

4. A wire harness comprising:
  the wire harness support member according to claim 1; and
  the electric wire supported on the vehicle body via the wire harness support member.

5. The wire harness support member according to claim 1, wherein the fixing hole has a width in the direction orthogonal to the length direction of the groove portion greater than a width of the bolt such that the bolt fixing member is movable relative to the bolt in the direction orthogonal to the length direction of the groove portion.

6. The wire harness support member according to claim 1, wherein the main body portion further includes a locking hole into which a locking bolt protruding from the vehicle body is to be inserted and fixed so as to prevent relative movement of the main body portion relative to the bolt fixing member.

* * * * *